(12) United States Patent
Kent

(10) Patent No.: US 7,607,823 B2
(45) Date of Patent: Oct. 27, 2009

(54) LEAK DETECTOR COMPRISING A SELF-HEATED THERMISTOR CONTROL CIRCUIT

(75) Inventor: Richard Kent, Norfolk, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 10/597,857

(22) PCT Filed: Mar. 2, 2005

(86) PCT No.: PCT/US2005/006718

§ 371 (c)(1),
(2), (4) Date: Aug. 10, 2006

(87) PCT Pub. No.: WO2005/085815

PCT Pub. Date: Sep. 15, 2005

(65) Prior Publication Data

US 2007/0160108 A1    Jul. 12, 2007

Related U.S. Application Data

(60) Provisional application No. 60/549,706, filed on Mar. 3, 2004.

(51) Int. Cl.
*G01N 27/20* (2006.01)
*G01K 1/00* (2006.01)
*G01K 7/22* (2006.01)

(52) U.S. Cl. ............... 374/4; 374/43; 374/45; 374/147; 374/185; 374/163

(58) Field of Classification Search .............. 374/4, 374/5, 45, 135, 29, 183, 185, 6–7, 43, 44, 374/30, 147, 164; 338/28, 22 R, 25; 702/53, 702/51; 73/1.17, 1.73, 40, 40.5 R, 605
See application file for complete search history.

(56) References Cited

U.S. PATENT DOCUMENTS

| 3,321,957 A | | 5/1967 | Blander et al. |
| 3,537,298 A | | 11/1970 | Kapff |
| 3,612,535 A | * | 10/1971 | Davis et al. .................. 273/238 |
| 3,691,821 A | | 9/1972 | Davey |
| 4,362,403 A | * | 12/1982 | Mooney .......................... 374/4 |
| 4,363,556 A | * | 12/1982 | Belliveau et al. ............ 374/183 |
| 4,392,782 A | | 7/1983 | Kuehn et al. |

(Continued)

FOREIGN PATENT DOCUMENTS

| JP | 62021033 A | 1/1987 |
| JP | 2003-101315 | 4/2003 |

*Primary Examiner*—Gail Verbitsky
(74) *Attorney, Agent, or Firm*—Anthony J. Janiuk

(57) ABSTRACT

A system and method for detecting leaks includes a sensing circuit including a first thermistor device adapted to detected a leak upon contact with a liquid, and, a second thermistor device functioning as a reference device. The first and second thermistor devices are driven with a current such that both devices operate in self-heated mode at a temperature above an ambient temperature. A control system controls a drive circuit for maintaining a constant application of power through both devices in response to a voltage monitored at a reference point in the sensing circuit including the reference thermistor. The voltage at a reference point in a portion of the sensing circuit including the first thermistor device is additionally monitored and compared with the voltage at the reference point in the sensing circuit including the second thermistor device. A leak condition is determined on the basis of a comparison result of the ambient temperature.

24 Claims, 1 Drawing Sheet

U.S. PATENT DOCUMENTS

| | | |
|---|---|---|
| 4,490,053 A | 12/1984 | Coston et al. |
| 4,749,855 A * | 6/1988 | Watanabe ............. 250/227.11 |
| 4,901,061 A | 2/1990 | Twerdochlib |
| 5,183,998 A * | 2/1993 | Hoffman et al. ............ 219/492 |
| 5,228,329 A * | 7/1993 | Dennison .................... 73/49.1 |
| 5,375,454 A * | 12/1994 | Andrejasich et al. ..... 73/40.5 R |
| 5,637,789 A | 6/1997 | Lawson |
| 6,161,100 A * | 12/2000 | Saar ........................... 705/412 |
| 6,246,831 B1 * | 6/2001 | Seitz et al. .................. 392/486 |
| 6,509,553 B2 * | 1/2003 | Golan et al. ................ 219/505 |
| 6,543,282 B1 | 4/2003 | Thompson |
| 6,559,771 B2 * | 5/2003 | Landis ....................... 340/603 |
| 6,804,990 B2 * | 10/2004 | Weber ........................... 73/40 |
| 7,181,965 B2 * | 2/2007 | Kearney et al. ............. 73/295 |
| 2003/0110834 A1 * | 6/2003 | Weber ........................... 73/40 |
| 2006/0283236 A1 * | 12/2006 | Trescott et al. ........... 73/40.5 R |

* cited by examiner

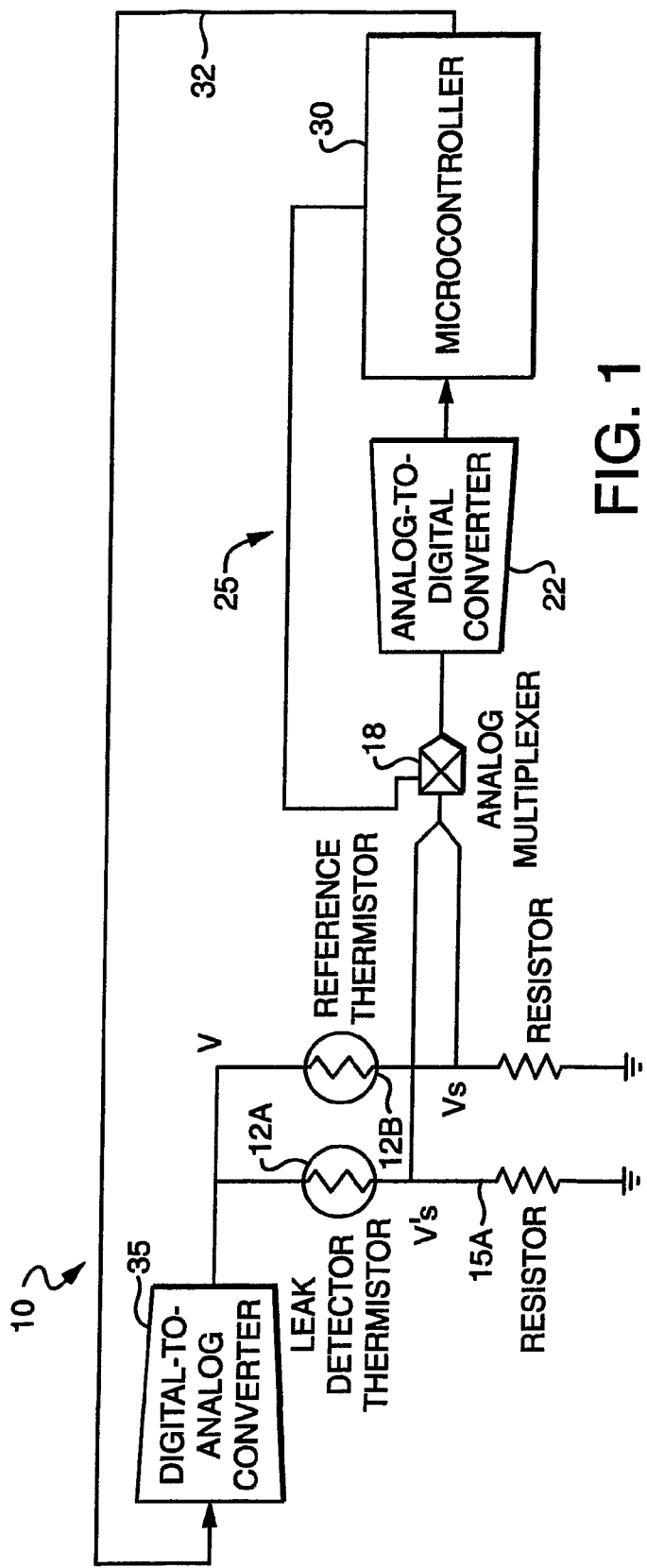
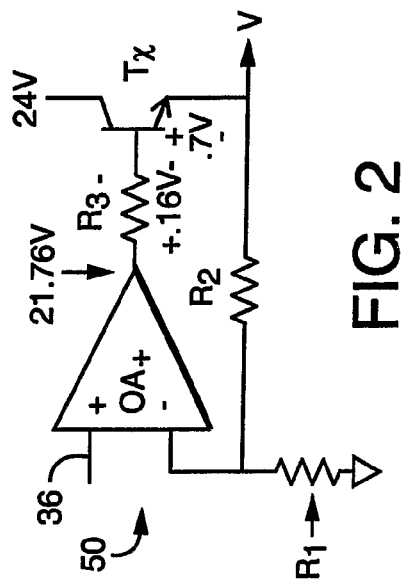
FIG. 1
FIG. 2

LEAK DETECTOR COMPRISING A SELF-HEATED THERMISTOR CONTROL CIRCUIT

CROSS REFERENCE RELATED APPLICATION INFORMATION

This application claims priority from U.S. Provisional Patent Application No. 60/549,706, filed Mar. 3, 2004. The contents of these applications are incorporated herein by reference.

FIELD OF THE INVENTION

The present invention is directed to electronic circuits for sensing leakage of liquid or air flow in a particular system and, particularly to a novel control circuit employing the use of a pair of thermistors to provide constant power dissipation in a self-heated mode as the ambient temperature changes.

BACKGROUND OF THE INVENTION

A thermistor is a thermally sensitive resistor whose primary function is to exhibit a change in electrical resistance with a change in its temperature. These devices typically exhibit a negative (nonlinear) resistance-vs.-temperature characteristic, i.e., resistance decreases with an increase in temperature, and are particularly useful when a large resistance change is needed for a narrow range of temperature. For most applications, the thermistor device is typically driven with a small amount of current. When driven with a larger amount of current, a self-heating effect occurs as an excessive amount of power is being dissipated, which heats up the resistor and makes temperature readings impossible.

Thus, when the thermistor device is driven with a large amount of current, it is called operating in a "self-heated" mode. To sense the presence of a liquid, a self-heated thermistor will be sitting at a certain temperature above the ambient temperature. When it comes into contact with water (or any liquid) the temperature of the thermistor will change due to the change in the thermal dynamics of the system. A parameter of the thermistor, known as the "dissipation constant", normally expressed in milliwatts per degree C. (mw/° C.), is the ratio of a change in power dissipation in a thermistor to the resultant body temperature change. So, in a particular application where it is desirable to measure presence of a liquid, as in a leak detector, the temperature of the thermistor in self-heated mode, is raised. For example, to raise the temperature of the thermistor by 30 C.°, and given an example dissipation constant of 1.0mw/° C., 30 milliwatts of drive power would have to be added in order to raise the temperature 30 C.° which is easily achievable knowing the voltage and resistance at a given temperature.

As an example of a 5.0 kohm thermistor device operating from a temperature between 4° C. to 40° C., raising its temperature 30 C.° in a self-heating mode would result in the thermistor's temperature ranging from 34° C. to 70° C. This would change the thermistor's resistance from 3404 ohms to 876 ohms. Thus, it is seen that the change in resistance is pretty dramatic, and results in different power levels being dissipated if a constant voltage or current source is applied.

Thus, in a self-heated thermistor measurement circuit, it is advantageous to provide a constant power dissipation at all times. Since the thermistors themselves change greatly in resistance over temperature, there are two disadvantages to not doing so. Firstly, what is a reasonable operating power at one temperature can become potentially damaging to the thermistor at another temperature. Secondly, a changing operating power dissipation may result in a changing sensitivity of the measurement circuit employing the thermistor.

Normally such self-heated thermistor measurement systems employ a thermistor device driven with constant current. To measure a leak, one thermistor may be used to work in almost all applications except for the fact that it is difficult to determine a leak on power up if the ambient temperature is not known. In such a scenario, it is advantageous to utilize two thermistors, one a reference thermistor that is always going to be at the ambient (on air) and another that will potentially be wet. The sensor thermistor is the one sensing the leak and a comparative measurement is taken which is performed typically using an analog circuit according to the prior art. Typically, in the prior art, the two self-heated thermistors are connected in the well-known "Wheatstone" Bridge configuration.

U.S. Pat. No. 4,392,782 is representative of a liquid level control device according to the prior art incorporating two thermistor devices that are operated under constant current conditions.

U.S. Pat. No. 6,543,282 is representative of an air flow apparatus according to the prior art incorporating two thermistor devices with one thermistor device having a temperature maintained above an ambient temperature, and with a sensor thermistor device subject to air flow conditions.

It would be highly desirable to provide a leak detector including self-heated thermistor devices that behave independent of the ambient temperature.

It would further be highly desirable to provide a control system for a leak detection device and a method of operating a leak detection system employing two self-heated thermistor devices.

It would further be highly desirable to provide a digital control system for a leak detection device and a method of operating a digital control system for a leak detection system employing two self-heated thermistors.

SUMMARY OF THE INVENTION

According to one aspect of the invention, there is provided a self-heated thermistor control circuit that functions as a leak detector. In accordance with this aspect, one of the two thermistors ("leak detector" thermistor) is positioned in a "drip tray" of an instrument or device employing the leak detector, to enable it to come into contact with a liquid, should there be a leak in the instrument. The other thermistor ("reference" thermistor) resides in close proximity, but is positioned so that it remains dry. The electronic circuit controls the power dissipated in the thermistors and at the same time determines if the "leak detector" thermistor senses a liquid in the "drip tray".

According to this aspect, a system and method is provided for detecting leaks that includes a sensing circuit including a first thermistor device adapted to detect a leak upon contact with a liquid, and, a second thermistor device functioning as a reference device. The first and second thermistor devices are driven with a current such that both devices operate in self-heated mode at a temperature above an ambient temperature. A control system controls a drive circuit for maintaining a constant application of power through both devices in response to a voltage monitored at a reference point in the sensing circuit including the reference thermistor. The voltage at a reference point in a portion of the sensing circuit including the first thermistor device is additionally monitored and compared with the voltage at the reference point in the sensing circuit including the second thermistor device. A leak condition is determined on the basis of a comparison result irregardless of the ambient temperature.

Advantageously, the present invention is adapted for implementation in many types of instruments and systems, particularly for leak detection applications, such as, for automatic sampling devices for liquid chromatographic systems.

According to a further aspect of the invention, the self-heated thermistor control circuit functions as an air flow detector application. In this embodiment, the sensing thermistor maintained at constant power condition is placed in the air flow path and the reference thermistor maintained at constant power condition resides in stagnant air at the same ambient temperature.

BRIEF DESCRIPTION OF THE DRAWINGS

Further features, aspects and advantages of the apparatus and methods of the present invention will become better understood with regard to the following description, appended claims, and the accompanying drawing where:

FIG. 1 illustrates a leak detector circuit 10 employing two self-heated thermistors according to the present invention.

FIG. 2 illustrates a self-heated thermistor 50 employed in the leak detector according to the present invention.

DETAILED DESCRIPTION OF THE PREFERRED EMBODIMENTS

The leak detector circuit 10 as shown in the example embodiment now described with reference to FIG. 1, employs the use of two self-heated thermistors 12a, 12b. One self-heated thermistor 12a is positioned to contact a leaking fluid, and the other self-heated thermistor 12b is used as a nearby dry reference. The two self-heated thermistors should be in close proximity, and preferably, built into the same package, one self-heated thermistor pointing up and one self-heated thermistor pointing down. These devices have output ports connected with analog multiplexer device 18 which is connected with the analog-to-digital converter (ADC) of a digital selector circuit 25. For a particular application, the reference thermistor is one pointing up, the one pointing down is adapted for positioning in a drip tray, for example, to be able to sense a leak. As a result, a comparative measurement is performed by digital control circuit 25 including a programmed microcontroller device 30 as will be explained in greater detail herein.

As mentioned, when a thermistor is used to measure temperature, applying a low current avoids self-heating, which can distort the measurement. In the example embodiment of the leak detector 10 of the present invention, the thermistors 12a, 12b are purposely heated. When the hot thermistor 12a comes into contact with a liquid, the liquid draws heat from the thermistor, lowering its temperature, and thus raising its resistance. When this happens, the voltage drop decreases across a series sense resistor 15a, which is buffered and multiplexed via analog multiplexer device 18 for input to an analog-to-digital converter (ADC) circuit 22 that performs an analog-to-digital conversion. As will be described in greater detail herein, a microprocessor is programmed to compare the ADC readings Vs and Vs' output at both respective thermistors' sense resistors 15a, 15b to determine if there is a leak. This comparison is performed by the programmed microcontroller device 30 on a periodic basis.

The control circuit 32 particularly utilizes a digital-to-analog converter circuit (DAC) 35 to provide each of the thermistors 12a, 12b with the required control voltage, V, according to the ambient temperature. As shown in FIG. 1, a control voltage V, is applied to the thermistors 12a, 12b in series with their respective sense resistors 15a, 15b, as described by the following equation:

$$V = V_T + V_S,  \quad \text{equation (1)}$$

where $V_T$ is the voltage across the thermistor, and $V_S$ is the voltage across the reference sense resistor.

Since $V_T = P_T/I_T$, where $P_T$ is the constant power being dissipated through thermistor device 12a and the same current flows through the reference sense resistor, then $V_T = P_T/(V_S/R_S)$. Thus, from equation (1), $$V = (P_T/(V_S/R_S)) + V_S  \quad \text{equation (2)}$$

Since $P_T$ and sense resistance $R_S$ are known values, the equation (2) relates V to only one unknown, $V_S$.

This value V is the voltage that the DAC device 35 delivers to keep both thermistor devices 12a, 12b at the desired self-heated mode, at a constant temperature rise above the ambient temperature. An optional drive circuit connected at the output of the DAC 35 may additionally be provided to maintain the drive needed for thermistors 12a, 12b. It is understood that the ambient temperature is not a factor in the equation as now described.

The method for maintaining a constant rise in the thermistor device having a predetermined dissipation constant and a pre-defined sense resistor is now described. In a first step, the ADC device output 22 is read by the microcontroller 30 to determine the voltage ($V_s$) at the reference sense resistor of the reference thermistor. The required DAC voltage (V) is computed by microcontroller device 30 in accordance with equation (2) in the example embodiment. Knowing the performance characteristics of the DAC device 35 (knowing the DAC reference voltage, for example), it is readily calculated what digital word (or bits) 32 needs to be input to the DAC to achieve the desired control voltage.

It should be understood that, in operation, the initial voltage V that is applied is not important, because the above procedure adjusts to the ambient temperature. By reading the ADC voltage output $V_S$ and utilizing equation (2), the system will stabilize.

The microcontroller 30 then periodically reads the Vs voltage so it periodically causes the voltage change to compensate for the changing resistance value. As the leak detection control circuit if FIG. 1 is a closed loop system, that voltage varies up and down, with a negligible amount of power variation (the temperature changes is almost negligible). In one embodiment, the loop is controlled periodically, e.g., every ten seconds, although this value is configurable depending upon the types of thermistor devices implemented and other system parameters.

During leak detection operation, at each period, the sense thermistor voltage, $V_S'$, is additionally measured and multiplexed to the ADC circuit and convertered into a form suitable for comparison by the microcontroller against the Vs voltage read. It is up to the programmed microcontroller to determine that a leak is being detected by the size and polarity of the difference between the ADC readings of the thermistor sense resistor voltages Vs and Vs'. Further, according to the invention, it is not necessary that the actual temperature of the thermistors be determined.

As the leak detection control circuit of the invention provides a constant power dissipation to thermistors as the ambient temperature varies, it is not necessary to know the ambient temperature. If necessary, the measurement sensitivity may be changed in (microcontroller programmed) software by changing the power dissipation. The software further determines what is considered a leak, which is important if the leak detector is installed in different locations for different purposes (e.g. slow or fast leaks). The software is further adapted to compensate for unknown real world situations that may occur that would cause false readings. Moreover, if the thermistors were to be replaced with a different physical version, it would most likely have a different "dissipation factor". The software is easily able to accommodate this change.

It is understood that any variations in the device may be offset and calibrated out. For example, when the instrument employing is first manufactured, this offset voltage is read and stored in battery backed memory so that when the instrument is turned on it knows what a normal offset is. That normal offset varies very little over the temperature change as compared to what the wet difference potential is going to be.

Advantageously, the leak detector device output is relatively stable over temperature. The mounting technique for the leak detector in the instrument, while possibly causing a shift in the leak detector output, is not detrimental to the performance of the leak detector. Further, it should be understood that there is no great difference in performance with different liquids.

The response of the leak detector to a liquid is sufficiently large as compared to the response of the leak detector to a change in temperature, allowing for a room-temperature calibration to compensate for the variation between devices.

According to a further aspect of the invention, the self-heated thermistor control circuit described herein with respect to FIG. 1 functions in an air flow detector application. In this embodiment, the sensing thermistor device is placed in the air flow path and the reference thermistor resides in stagnant air at the same ambient temperature. Detection of an air flow will reduce the temperature of the self-heated sensor thermistor device that may be easily detected regardless of the ambient temperature.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what I claim as new, and desire to secure by Letters Patent is:

1. A fluid leak detector comprising:
a sensing circuit including a first thermistor device adapted to detect a fluid leak upon contact with a liquid, and, a second thermistor device functioning as a reference device;
means for driving said first and second thermistor devices with a current such that both said first and second thermistor devices operate in self-heated mode at a temperature above an ambient temperature; and,
a control system for controlling said driving means so as to maintain a constant application of power through both said first and second thermistor devices in response to a voltage Vs monitored at a reference point in a portion of said sensing circuit including said second thermistor device, said control system including means for monitoring the voltage Vs' at a reference point in a portion of said sensing circuit including said first thermistor device; and,
a comparing means for comparing the voltage Vs' at a reference point in said sensing circuit including said first thermistor device with the voltage Vs at a reference point in said sensing circuit including said second thermistor device and determining a fluid leak condition on the basis of a comparison result irregardless of said ambient temperature.

2. The fluid leak detector as claimed in claim 1, wherein said means for monitoring the voltage at a reference point in said sensing circuit includes means for measuring said voltage Vs at a reference point in said sensing circuit connecting said second thermistor with a reference resistor connected in series therewith and further monitors a voltage characteristic Vs' at a reference point in said sensing circuit connecting said first thermistor to a further reference resistor connected in series, said control system comprising:
means for converting said measured voltage Vs into a corresponding digital signal; and,
controller means for processing said digital signal and generating a digital representation of a drive voltage value V to be applied to both said first and second thermistor devices of said sensing circuit by said driving means for driving said first and second thermistor devices at said constant power, said control system comprising a closed loop system.

3. The fluid leak detector as claimed in claim 2, wherein said control system further comprises a means for converting said digital value output of said controller means into said drive voltage V.

4. The fluid leak detector as claimed in claim 2, wherein the processing performed by said controller means for generating said voltage value comprises computing a drive voltage given the constant power requirement for operating said first and second thermistors in said self-heated mode and a value of a sense resistor connected in series with said reference thermistor.

5. The fluid leak detector as claimed in claim 3, wherein said means for converting said measured voltage Vs into a corresponding digital signal includes an analog-to-digital converter device.

6. The fluid leak detector as claimed in claim 3, wherein said means for converting said voltage value to be applied to said first thermistor device into a corresponding analog drive voltage V includes a digital-to-analog converter.

7. The fluid leak detector as claimed in claim 5, wherein said monitoring means includes a multiplexor device means for conducting said Vs and Vs' voltages at corresponding reference points in said sensing circuit to said analog-to-digital converter device, said first thermistor device producing a different voltage Vs' upon detection of a fluid leak which is immediately detectable as a result of said comparison.

8. The fluid leak detector as claimed in claim 3, wherein said monitoring means and said controller means are programmed to obtain the reference voltages Vs and Vs' periodically, wherein a fluid leak is detected if said Vs and Vs' differ by an amount to indicate a change in temperature due to said first thermistor coming into contact with a liquid.

9. The fluid leak detector as claimed in claim 1, further adapted to detecting an air flow condition, said first thermistor device in self-heated mode functioning as a sensor thermistor for detecting an air flow condition and said second thermistor device in self-heated mode functioning as a reference thermistor subject to stagnant air.

10. A program storage device readable by a machine, tangibly embodying a program of instructions executable by the machine to perform method steps for detecting fluid leaks in an instrument of claim 1, said method steps comprising:
a) driving a fluid leak detector circuit in a manner so as to provide constant power dissipation in both a first thermistor device adapted to detect a fluid leak upon contact with a liquid and, a second thermistor device functioning as a reference device, said first and second thermistor devices adapted to being driven with a current to operate in self-heated mode at a temperature above an ambient temperature;
b) receiving a first voltage Vs' at a reference point in said fluid leak detector circuit that connects said first reference thermistor device and a first resistor device connected in series, and receiving a second voltage Vs at a reference point in said fluid leak detector circuit that connects said second reference thermistor device and a second resistor device connected in series; and,
c) comparing said first Vs' and second Vs voltages; and,
d) determining a fluid leak condition on the basis of a comparison result irregardless of said ambient temperature.

11. The program storage device readable by a machine as claimed in claim 10, wherein said driving step a) comprises the further method steps of:

monitoring a voltage Vs at a reference point in a portion of said sensing circuit connecting said second thermistor device with a reference resistor connected in series therewith;

converting said measured voltage Vs into a corresponding digital signal;

processing said digital signal and generating a digital representation of a drive voltage value V to be applied to both said first and second thermistor devices of said sensing circuit by a driving means for driving said first and second thermistor devices at said constant power; and, converting said generated digital representation into said drive voltage V.

12. The program storage device readable by a machine as claimed in claim 11, wherein the processing step includes computing a drive voltage value given a constant power requirement for operating said first and second thermistors in said self-heated mode and a value of a sense resistor connected in series with said reference thermistor.

13. The program storage device readable by a machine as claimed in claim 11, wherein said step b) of receiving a first voltage Vs' at a reference point and receiving a second voltage Vs includes the step of multiplexing said first voltage Vs' and second voltage Vs to an analog-to-digital converter device for converting said measured voltages into corresponding digital signals.

14. The program storage device readable by a machine as claimed in claim 11, wherein said step b) of receiving a first voltage Vs' at a reference point and receiving a second voltage Vs is performed periodically.

15. A method for detecting fluid leaks in an instrument, said method comprising:
a) driving a fluid leak detector circuit in a manner so as to provide constant power dissipation in both a first thermistor device adapted to detect a fluid leak upon contact with a liquid and a second thermistor device functioning as a reference device, said first and second thermistor devices adapted to being driven with a current to operate in self-heated mode at a temperature above an ambient temperature;
b) receiving a first voltage Vs' at a reference point in said fluid leak detector circuit that connects said first reference thermistor device and a first resistor device connected in series, and receiving a second voltage Vs at a reference point in said fluid leak detector circuit that connects said second reference thermistor device and a second resistor device connected in series; and,
c) comparing said first Vs' and second Vs voltages; and,
d) determining a fluid leak condition on the basis of a comparison result irregardless of said ambient temperature.

16. The method for detecting fluid leaks as claimed in claim 15, wherein said driving step a) comprises the steps of:
monitoring a voltage Vs at a reference point in a portion of said sensing circuit connecting said second thermistor device with a reference resistor connected in series therewith;
converting said measured voltage Vs into a corresponding digital signal; and,
processing said digital signal and generating a digital representation of a drive voltage value V to be applied to both said first and second thermistor devices of said sensing circuit by a driving means for driving said first and second thermistor devices at said constant power; and,
converting said generated digital representation into said drive voltage V.

17. The method for detecting fluid leaks as claimed in claim 16, wherein the processing step includes computing a drive voltage value given a constant power requirement for operating said first and second thermistors in said self-heated mode and a value of a sense resistor connected in series with said reference thermistor.

18. The method for detecting fluid leaks as claimed in claim 16, wherein said step of converting said measured voltage Vs into a corresponding digital signal includes implementing an analog-to-digital converter device.

19. The method for detecting fluid leaks as claimed in claim 16, wherein said step of converting said generated digital representation includes implementing a digital-to-analog converter device.

20. The method for detecting fluid leaks as claimed in claim 18, wherein said step b) of receiving a first voltage Vs' at a reference point and receiving a second voltage Vs includes the step of multiplexing said first voltage Vs' and second voltage Vs to said analog-to-digital converter device, said first thermistor device producing a different voltage Vs' upon detection of a fluid leak which is immediately detectable as a result of said comparison.

21. The method for detecting fluid leaks as claimed in claim 18, wherein said step b) of receiving a first voltage Vs' at a reference point and receiving a second voltage Vs is performed periodically.

22. A control circuit for a detector device comprising a sensing circuit including a first thermistor device adapted to detect an environmental condition, and, a second thermistor device functioning as a reference device, said control circuit comprising:
means for driving said first and second thermistor devices with a current such that both manner such that said first and second thermistor devices operate in self-heated mode at a temperature above an ambient temperature; and,
means for monitoring a voltage Vs at a reference point in a portion of said sensing circuit connecting said second thermistor device with a sense resistor;
a control system for controlling said driving means so as to maintain a constant application of power through both said first and second thermistor devices in response to said voltage Vs, said means additionally monitoring a voltage Vs' at a reference point in a portion of said sensing circuit including said first thermistor device; and,
a comparing means for comparing the voltage Vs' at a reference point in said sensing circuit including said first thermistor device with the voltage Vs at a reference point in said sensing circuit including said second thermistor device and detecting said environmental condition on the basis of a comparison result irregardless of said ambient temperature.

23. The control circuit as claimed in claim 22, wherein said sensing circuit detects an environmental condition comprising the presence of a liquid contacting said first thermistor device.

24. The control circuit as claimed in claim 22, wherein said sensing circuit detects an environmental condition comprising the presence of an air flow contacting said first thermistor device.

* * * * *